United States Patent
Henning

[15] 3,685,792
[45] Aug. 22, 1972

[54] SNAP ACTION VALVE ACTUATOR
[72] Inventor: Donald S. Henning, Thiensville, Wis.
[73] Assignee: Autotrol Corporation, Milwaukee, Wis.
[22] Filed: April 22, 1971
[21] Appl. No.: 136,433

[52] U.S. Cl..................................251/75, 74/112
[51] Int. Cl. ...........................F16k 1/18, F16k 31/44
[58] Field of Search .........74/2, 112; 251/74, 75, 230

[56] References Cited

UNITED STATES PATENTS 3,554,482    1/1971    Dunkin........................251/74

Primary Examiner—Henry T. Klinksiek
Attorney—Thomas W. Ehrmann and Barry E. Sammons

[57] ABSTRACT

A cam is rapidly rotated against the actuating stem of a flapper valve to quickly open the valve. The cam is formed on a ratchet wheel which is mounted for limited rotary motion around a rotor. The rotor and attached ratchet wheel are driven slowly forward by a cam shaft until the ratchet wheel is locked by an engaging pawl. The rotor continues to rotate, winding a bias spring connecting the ratchet wheel and rotor. The pawl is disengaged by an escapement cam extending from the rotor and the bias spring unwinds, snapping the ratchet wheel and cam forward to actuate the valve. The valve is held open until the cam is rotated clear of the actuating stem.

10 Claims, 6 Drawing Figures

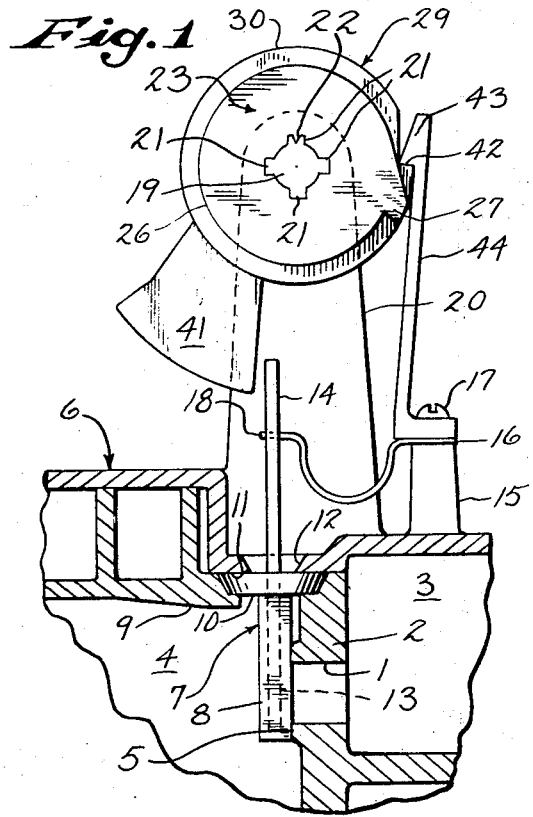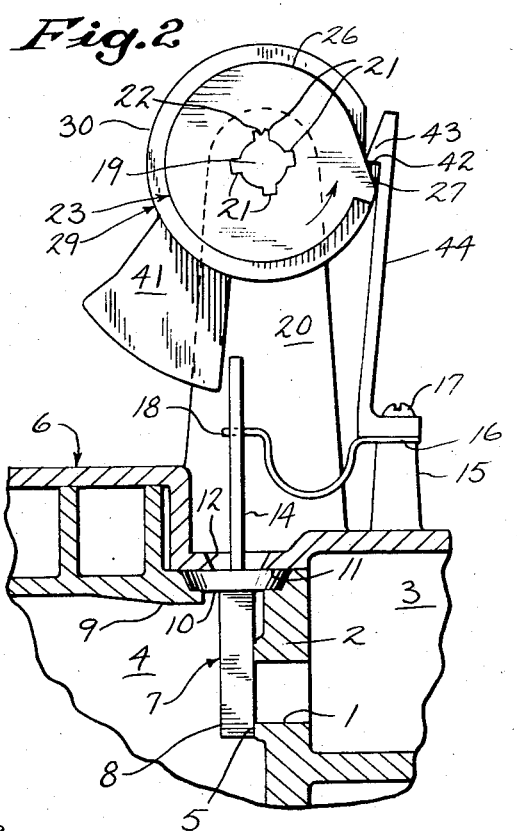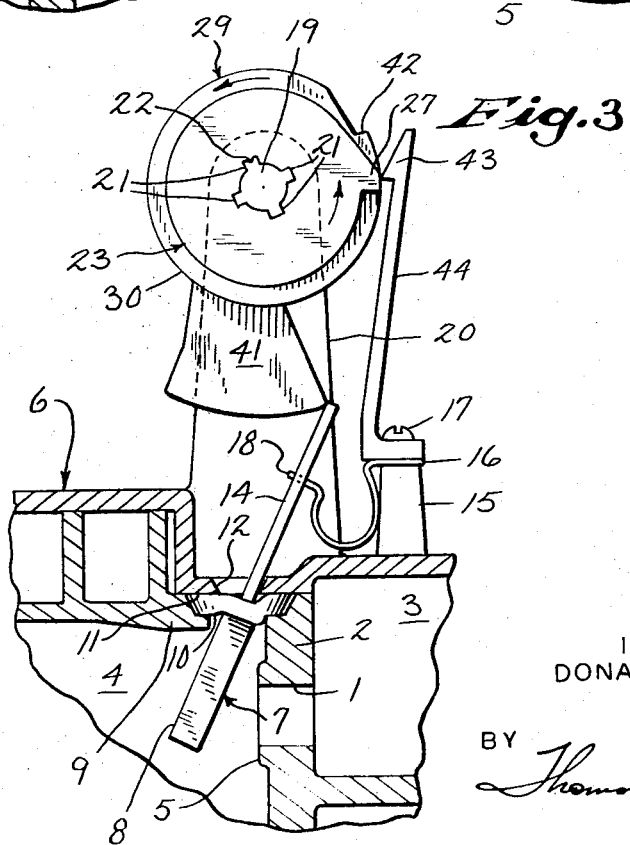
INVENTOR
DONALD S. HENNING
BY Thomas W. Shrmann
ATTORNEY

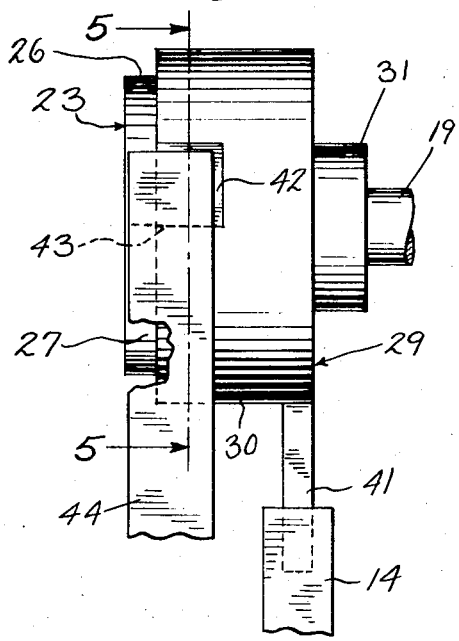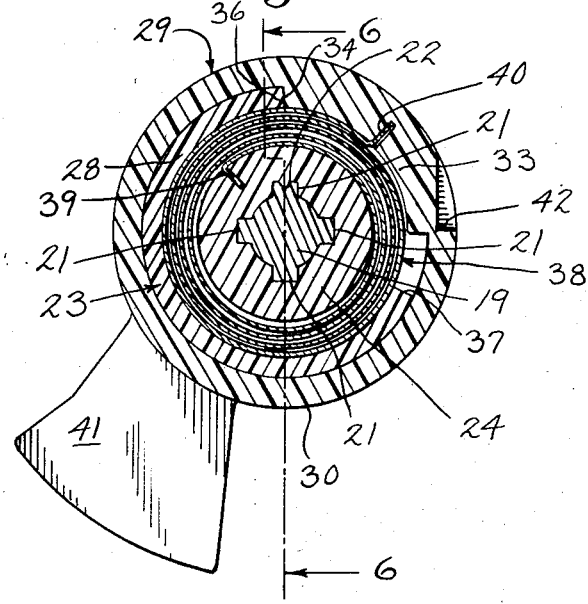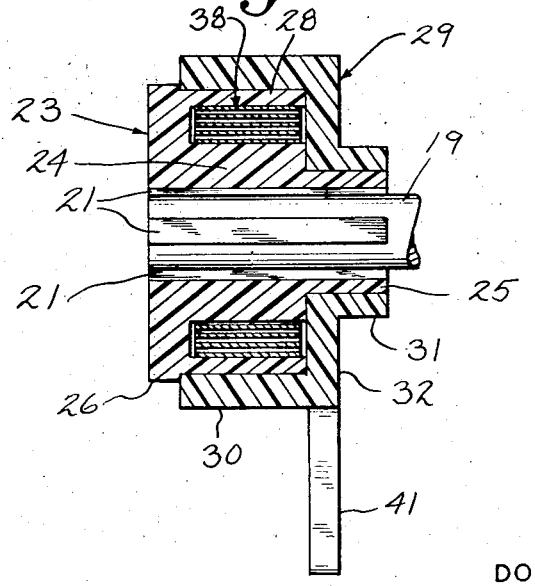

SNAP ACTION VALVE ACTUATOR

BACKGROUND OF THE INVENTION

The field of the invention is actuators for opening and closing valves, and more particularly the automatic actuation of fluid valves by the application of a sudden actuating stroke.

It is common in fluid controls to govern the opening and closing of a valve, or a series of valves, by the use of actuating cams which operate mechanically upon the valves. The actuating cams can be used to control the actuating sequence of a series of valves, or the length of time during which a valve is actuated, or both. Such cam actuated fluid controls are used, for example, in the automatic control of the periodic regeneration of water softeners.

In such fluid controls the cam is commonly moved at a relatively low speed and requires a significant stroke between initial engagement with the valve and full opening of the valve. As a result the valve is opened gradually and this gradual opening can produce undesirable consequences. One undesirable consequence, valve chatter, manifests itself in fluid controls which use flapper valves.

Flapper valves include a flap which pivots about a flexible flange securely fastened in an opening through the valve body. They include an actuating stem connected to the flap to pivot the same about the flange. The actuating stem extends outside the valve body and is actuated to pivot the flap between a closed position in which it covers a fluid opening in the body, and an open position in which the fluid opening is clear. In water softener controls using flapper valves each actuating stem is struck, or actuated, by a cam, extending radially outward from a cam shaft which is rotated during the operating cycle. As the cam shaft rotates, the cams are slowly revolved into engagement with their respective flapper valves. The valves are thus selectively actuated to perform the water softener regeneration cycle.

The cam shaft is typically rotated very slowly during its operating cycle; for example, one quarter revolution per minute, or slower. Also, the flap is not moved to a fully open position until the cam has rotated through a further arc after the initial engagement with the actuating stem. As a consequence, the flapper valves are slowly unseated from the fluid openings, and chattering, or oscillation of the valve flap occurs. Chattering is an undesirable condition in which the flap oscillates between a partially open and a closed position, and is particularly noticeable with larger flapper valves opening against fluid pressure. The condition causes excessive wear on the control system and particularly on the flapper valve itself.

SUMMARY OF THE INVENTION

The present invention relates to an actuator for rapidly revolving a cam through its actuating stroke to quickly and completely actuate its associated valve. More particularly, the invention includes a ratchet wheel to which the actuating cam is attached, which ratchet wheel is connected to the cam shaft to normally rotate therewith but which is also adapted for limited relative rotational displacement between a release position and a cocked position with respect to the shaft; biasing means connected to urge the ratchet wheel to the release position; locking means connected for engaging and holding the ratchet wheel so that the ratchet wheel will be displaced to the cocked position as the shaft rotates; and means for releasing the locking means when the ratchet wheel has been displaced to the cocked position. Upon disengagement, the ratchet wheel and attached cam are snapped forward to the release position by the biasing means. The cam is oriented such that the snap action occurs during the valve actuation portion of its operating cycle.

In the preferred embodiment, the ratchet wheel and attached cam rotate slowly with the cam shaft during the major portion of the operating cycle. Just prior to the engagement of the cam with the valve, the cam is stopped by locking the ratchet wheel against rotation. The cam shaft continues to rotate forward, thereby winding a bias spring and cocking the actuator mechanism. An escapement cam is rotated by the cam shaft into contact with the locking means to disengage the same and release the ratchet wheel. The energy stored in the wound bias spring is quickly released and the ratchet wheel with attached cam is rapidly rotated, or snapped, forward.

An object of the present invention is to prevent flapper valve chatter by rapidly opening the flapper valve. The cam is locked against rotation just prior to its engagement with the flapper valve actuating stem. The cam shaft continues to rotate slowly ahead in the forward direction. When the ratchet wheel is released, the cam is snapped forward, catching up with the cam shaft and completely opening the flapper valve.

Another object of the invention is to provide a means for quickly actuating a valve, which means is operated automatically by the rotation of the cam shaft. After the ratchet wheel is locked, the cam shaft continues to rotate and wind the bias spring. The stored energy is released by the escapement cam to snap the actuating cam against the valve. The sequence automatically repeats for every revolution of the cam shaft, thus requiring no external means for resetting the mechanism.

Still another object of the invention is to provide a snap action valve actuator for a fluid control wherein both the initiation of the rapid valve actuation and the duration of actuation can be governed by controlling the rotation of a cam shaft which mounts the actuator.

The foregoing and other objects and advantages of the invention will appear from the following description. In the description reference is made to the accompanying drawings which form a part hereof, and in which there is shown by way of illustration and not of limitation a preferred embodiment of the invention.

BRIEF DESCRIPTION OF THE DRAWINGS

FIGS. 1 through 3 are front elevation views of the valve actuator of the present invention, showing three successive phases of its operating cycle, FIG. 4 is a view in side elevation of the valve actuator, FIG. 5 is a view in cross section of the valve actuator of FIG. 4 taken on the plane 5—5, and FIG. 6 is a view in cross section of the valve actuator of FIG. 5 taken on the plane 6—6.

DESCRIPTION OF THE PREFERRED EMBODIMENT

As shown in FIGS. 1 through 3, a circular fluid opening 1 is formed in a partition 2 which separates an outlet chamber 3 from an inlet chamber 4. An annular-shaped valve seat 5 is formed on the inlet side of the partition around the fluid opening 1. The outlet and inlet chambers 3 and 4 form part of a fluid control system. The control system structure is not pertinent to the description of the present invention and is only referred to generally herein as the valve body or frame 6. Fluid flow through the opening 1 from the inlet chamber 4 to the outlet chamber 3 is controlled by means of a flapper valve 7. The flapper valve 7 includes a rectangular flap portion 8 which is resiliently connected to the top wall 9 of the fluid chamber 4 by means of an elastic fulcrum flange 10. The fulcrum flange 10 has a circular cross section with its outer rim portion tapered and rigidly retained in a mating annular groove 11 formed in the top wall 9 around a stem opening 12. The flap 8 extends downward from the fulcrum flange 10 to rest against the valve seat 5, thereby closing the fluid opening 1. The flap 8 is formed by coating a rigid rectangular plate 13 with a natural or synthetic rubber. The plate 13 is formed as an integral part of an actuating stem 14 which extends upward through the fulcrum flange 10 through the stem opening 12, and substantially above the top surface of the frame 6. A pedestal 15 is formed on the top surface of the frame 6 adjacent the stem opening 12. The pedestal 15 extends upward from the top surface and has one end of a fixed spring 16 attached to its top surface by means of a screw 17. The other end of the fixed spring 16 has a tab 18 which fits through an opening and attaches to a point intermediate of the length of the actuating stem 14.

As shown in FIGS. 1 and 2, when the flapper valve 7 is not actuated, the fixed spring 16 provides a force which acts to pivot the actuating stem 14 about the fulcrum flange 10 away from the pedestal 15 to seat the flap 8 tightly against the valve seat 5. As shown in FIG. 3, the flapper valve 7 is actuated by pivoting the actuating stem 14 towards the pedestal 15, thereby flexing the flange 10 and swinging the flap 8 away from the valve seat 5 to expose the fluid opening 1. The fulcrum flange 10 is also formed from a natural or synthetic rubber integral with the coating on the flap 8 and will deform to accommodate the motion of the actuating stem 14. When the actuating stem 14 is released, the fixed spring 16 pivots the actuating stem 14 back to its upright, or unactuated position, to close the flap 8 over the fluid opening 1.

The flapper valve 7 may be one of a number of such valves mounted within the frame 6 to control the flow of fluids between various chambers. In a water softener control, for example, these valves are actuated at different times and are held open for differing time intervals. Each such flapper valve 7 is actuated by an actuating cam which is rotated by a cam shaft into engagement with the actuating stem of the flapper valve. The valve actuator of the present invention provides an improved means for achieving the actuation of the flapper valve by such a rotating cam arrangement.

Referring to FIGS. 1 through 3, a cam shaft 19 is rotatably mounted above the top surface of the frame 6 by means well known to the art, and represented schematically in the drawings by the standard 20. The cam shaft 19 is driven by an electric motor (not shown in the drawings) in the counterclockwise direction at a relatively slow speed, such as one-quarter revolution per minute. The cam shaft 19 has four keys 21 running its entire length and positioned in quadrature around its circumference. One key 21 has a V-shaped locating notch 22 formed along its entire length.

As shown best in FIGS. 5 and 6, the valve actuator includes a rotor 23 having a central opening through which the cam shaft 19 passes. The central opening includes keyways which mate with the keys 21 to prevent relative rotation between the rotor 23 and cam shaft 19, and to properly orient the actuator on the shaft 19. The rotor 23 includes a circular cylindrical drum portion 24, a neck portion 25 integrally formed to one end of the drum 24, and a front flange portion 26 integrally formed to the other end of the drum 24. The rim of the front flange 26 is generally circular and has a diameter substantially greater than that of the drum 24. As shown in FIGS. 1 through 3, the front flange 26 includes an escapement cam 27 integrally formed to and extending radially outward from its rim.

Referring to FIGS. 4 through 6, the rotor 23 also includes a sleeve 28 which is integrally formed to the front flange 26 near its rim and around a major sector of its circumference. The sleeve 28 extends axially back along the length of the drum 24 to form an annular-shaped cavity between its inner surface and the outer surface of the drum 24.

A ratchet wheel 29 is rotatably retained around the rotor 23. The ratchet wheel 29 includes a circular collar portion 30 of substantially uniform thickness which extends around and slidably engages the outside surface of the sleeve 28. The ratchet wheel 29 also includes a ring portion 31 of substantially uniform thickness which extends around and slidably engages the outer surface of the neck 25. The ring portion 31 is of substantially less diameter than the collar portion 30 and an annular-shaped back wall 32 joins the back end of the collar 30 to the front end of the ring 31. A land 33 is formed over a minor sector of the interior surface of the collar 30 and extends radially inward a distance slightly less than the thickness of the rotor sleeve 28.

The land 33 is positioned to ride in the gap in the rotor sleeve 28 and cooperates with the edges of the sleeve 28 to define the limits of relative rotational displacement between the ratchet wheel 29 and the rotor 23. Thus, the ratchet wheel 29 and the rotor 23 may be rotated, or displaced, relative to each other between a release position (shown in FIG. 5) in which the leading edge 34 of the land 33 abuts against one edge 36 of the sleeve 28 and a cocked position in which the trailing edge 35 abuts against the second edge 37 of the sleeve 28.

The ratchet wheel 29 and rotor 23 are operatively connected by a bias spring 38. The bias spring 38 is a flat spiral spring having its inner end turned radially inward and anchored in a slot 39 formed in the rotor drum 24, and with its outer end turned radially outward and anchored in a slot 40 formed in the land 33. The slots 39 and 40 are aligned such that the bias spring 38 exerts a residual torque on the ratchet wheel 29 and rotor 23, holding them firmly in the release position.

Thus, so long as the ratchet wheel 29 is free to rotate, any rotation of the rotor 23 and cam shaft 19 will be accompanied by corresponding rotation of the ratchet wheel 29.

Extending radially outward from the outer surface of the ratchet wheel 29 is an actuating cam 41. The cam 41 is aligned axially with the back wall 32, and its circumferential position on the ratchet wheel 29 is determined by the timing requirements for the flapper valve 7 which it operates. The length of cam surface of the cam 41 may likewise be determined by the length of time the flapper valve 7 is to remain actuated. As shown best in FIGS. 1 and 4, the cam 41 extends radially outward a sufficient distance to strike the actuating stem 14 and fully open the flapper valve 7.

A tooth 42 is also formed on the outer surface of the ratchet wheel collar 30, but at the front edge of the collar 30. The tooth 42 is formed by the trailing edge of a wedge-shaped recess cut in the surface of the collar 30. A pawl 43 formed on the top end of an arm 44 is attached to the frame 6 and positioned to bear against the outer surface of the ratchet wheel collar 30 as it rotates. The lever 44 is attached to the pedestal 15 along with the fixed spring 16 and is in axial alignment with the tooth 42 such that the pawl 43 engages the tooth 42 and locks the ratchet wheel 29. The pawl 43 also overlies the front flange portion 26 of the rotor 23 so that it is in the path of travel of the escapement cam 27.

OPERATION

Referring to FIGS. 1 through 3, the cam shaft 19 rotates both the rotor 23 and ratchet wheel 29 in a counterclockwise direction during the operating cycle of control so long as the pawl 43 is clear of the tooth 42. During this rotation the pawl 43 rides over the surface of the ratchet wheel 29 until it reaches and engages the tooth 42 on the ratchet wheel 29, locking the ratchet wheel 29 and preventing its rotation. As shown in FIG. 1, the tooth 42 is positioned such that locking occurs just before the leading edge of the cam 41 engages the actuating stem 14. While ratchet wheel 29 is locked in this position, the rotor 23 can continue to rotate forward with the cam shaft 19, against the force of the bias spring 38. As a consequence, the rotor 23 rotates out of the release position with the ratchet wheel 29 towards the cocked position. The bias spring 38 is wound, storing energy, until the cocked position shown in FIG. 2 is reached. At this point, the leading edge of the escapement cam 27 engages and unhooks the pawl 43 from the tooth 42 thereby releasing the ratchet wheel 29. The potential energy stored in the bias spring 38 is immediately released thereby urging the ratchet wheel 29 toward the release position relative to the rotor 23. The ratchet wheel 29 is quickly rotated forward and the actuating cam 41 is swung rapidly against the actuating stem 14 to a fully open position shown in FIG. 3. The flapper valve 7 is thus rapidly opened and the cam 41 can then resume timed rotation with the cam shaft 19 to hold the flapper valve 7 open for the desired time interval. The trailing edge of the timing cam 41 is rotated forward with the cam shaft 19 to a point where the actuating stem 14 is released, and the fixed spring 16 acts to quickly close the flap 8 against the valve seat 5.

In the preferred embodiment the release and cocked positions are disposed 25 degrees apart and the escapement cam 27 is position on the rim of the rotor flange 26 to disengage the pawl 43 from the tooth 42 immediately before the second sleeve edge 37 engages the trailing edge of the land 33. Thus, the cam shaft 19 will rotate through approximately 25° between the engagement and disengagement of the pawl 43 with the ratchet wheel 29 and the cam 41 will be snapped or rotated forward through this same arc when released. The rapid 25° swing of the cam 41 is sufficient to pivot the flapper valve 7 from a closed to a fully open position thus eliminating the condition presented by prior valve actuators which resulted in chatter. The amount of snap action needed to fully open the flapper valve will, of course, vary considerably depending on such variables as actuator stem length, timing cam size, and the spacing between the cam shaft and the valve fulcrum; and the present invention is not limited to any particular set of such dimensions.

I claim

1. A snap action valve actuator, which comprises:

a rotor adapted for connection to a shaft which is rotated in a forward direction with respect to a frame;

a ratchet wheel connected to normally rotate with said rotor and adapted for limited relative rotational displacement between a release position and a cocked position with respect to said rotor;

a bias spring connected between said rotor and said ratchet wheel and urging said rotor and said ratchet wheel in said release position;

locking means connected to the frame and adapted to engage and hold said ratchet wheel against rotation so that said ratchet wheel will be displaced to said cocked position upon further forward rotation of said rotor;

escapement means connected to said rotor and adapted to disengage said locking means when said rotor has rotated forward to displace said ratchet wheel to said cocked position;

a timing cam connected to said ratchet wheel and adapted to actuate a valve when the ratchet wheel rotates rapidly forward to the release position upon disengagement of said locking means.

2. A snap action valve actuator in accordance with claim 1, wherein said locking means includes a pawl which engages a tooth on said ratchet wheel, and said escapement means includes an escapement cam connected to the rotor to contact said pawl and move said pawl from engagement with said tooth.

3. A snap action valve actuator in accordance with claim 2, wherein said cam actuates a flapper valve by pivoting its actuating stem.

4. A snap action valve actuator in accordance with claim 2, wherein said rotor includes:

a drum connected to said shaft;

a flange connected to one end of the drum and extending radially outward therefrom; and a sleeve projecting from said flange and extending circumferentially around said drum, said sleeve having an opening defined by first and second sleeve edges.

5. A snap action valve actuator in accordance with claim 4, wherein said bias spring is a flat spiral spring positioned around said rotor drum and having an inner end anchored to said rotor drum.

6. A snap action valve actuator in accordance with claim 5, wherein said ratchet wheel includes:
a collar rotatably disposed around said rotor; and
a release stop connected to said collar to ride in said sleeve opening and bear against said first sleeve edge when said ratchet wheel is in said release position.

7. A snap action valve actuator in accordance with claim 6, wherein said bias spring has an outer end anchored to said collar, and said rotor sleeve extends axially from said flange substantially the length of said rotor drum to form a cavity therebetween in which said bias spring is retained.

8. In a fluid control assembly having a cam shaft for operating an actuating cam to engage the actuating stem of a flapper valve mounted to a frame, a valve actuator comprising:
a ratchet wheel mounting said cam and connected to normally rotate with said cam shaft, said ratchet wheel being also adapted for limited relative rotational displacement between a release position and a cocked position with respect to said cam shaft;
biasing means connected between said ratchet wheel and said cam shaft and urging said ratchet wheel to said release position;
locking means connected to said frame for engaging and holding said ratchet wheel when said cam approaches contact with said actuating stem so that said ratchet wheel will be displaced to said cocked position as said cam shaft is thereafter rotated;
and means for releasing said locking means when said ratchet wheel has been displaced to said cocked position whereby said cam will engage and shift said actuating stem as said ratchet wheel rotates rapidly to said release position.

9. The assembly in accordance with claim 8, wherein said locking means includes a pawl which engages a tooth on said ratchet wheel, and said release means comprises an escapement cam connected to rotate with said cam shaft and to contact and move said pawl from engagement with said tooth.

10. The assembly in accordance with claim 8 wherein said release position and said cocked position are angularly displaced an amount which is substantially the same as the angular stroke required by said cam to shift said actuating stem and open said flapper valve sufficiently to prevent valve flutter.

* * * * *